United States Patent [19]

Mazumder

[11] Patent Number: 4,665,371

[45] Date of Patent: May 12, 1987

[54] CHARACTER SPACING CIRCUIT FOR CONTROLLING PRINT HAMMER FIRING

[75] Inventor: Ali T. Mazumder, Waterloo, Canada

[73] Assignee: NCR Corporation, Dayton, Ohio

[21] Appl. No.: 886,857

[22] Filed: Jul. 18, 1986

Related U.S. Application Data

[63] Continuation-in-part of Ser. No. 546,129, Oct. 27, 1983, abandoned.

[51] Int. Cl.[4] .................. H03K 5/13; H03K 5/153; B41L 47/46; B41F 13/24
[52] U.S. Cl. ................................. 328/129.1; 101/91; 101/233; 307/234; 307/517; 307/518
[58] Field of Search .......... 328/111, 119, 109, 129.1, 328/130.1; 307/234, 517, 518; 101/91, 233; 377/20, 45, 123, 125

[56] References Cited

U.S. PATENT DOCUMENTS

| | | | |
|---|---|---|---|
| 3,678,847 | 7/1972 | Pear, Jr. et al. | 101/93 C |
| 3,705,417 | 12/1972 | Asmussen | 307/234 |
| 3,866,533 | 2/1975 | Gilbert et al. | 101/93.14 |
| 3,980,960 | 9/1976 | Hutchinson | 307/234 |
| 3,986,091 | 10/1976 | Quiogue et al. | 318/594 |
| 4,015,701 | 4/1977 | Templeton | 101/91 |
| 4,203,678 | 5/1980 | Nordstrom et al. | 400/320 |
| 4,235,167 | 11/1980 | Staugaard | 101/93.09 |
| 4,259,903 | 4/1981 | Arendt et al. | 101/93.03 |
| 4,286,516 | 9/1981 | Wertanen | 101/93.03 |
| 4,552,065 | 11/1985 | Billington et al. | 101/233 |

*Primary Examiner*—John Zazworsky
*Attorney, Agent, or Firm*—Wilbert Hawk, Jr.; Albert L. Sessler, Jr.; Elmer Wargo

[57] ABSTRACT

A circuit for controlling the firing of a print hammer so as to maintain constant intercharacter spacing during printing. The speed of a motor which moves a document in printing relationship with a printer is used to ascertain the instantaneous velocity of the document just prior to the firing of a hammer associated with the printer. An up/down counter is used in determining the delay, if any, in firing the hammer to compensate for instantaneous velocities which are slower than the fastest velocity of document travel expected.

8 Claims, 7 Drawing Figures

FIG. 4 SHAFT ENCODER 68

FIG. 5 HAMMER PULSE

CHARACTER SPACING CIRCUIT FOR CONTROLLING PRINT HAMMER FIRING

This application is a continuation-in-part of Ser. No. 546,129 which was filed on Oct. 27, 1983, now abandoned.

BACKGROUND OF THE INVENTION

This invention relates to a control circuit for controlling the firing of a print hammer so as to maintain constant inter-character spacing when printing.

When specific styles of fonts such as E13B, OCR-A, CMC7, and OCR-B, for example, are printed on documents like checks and deposit slips used in the banking industry, for example, it is necessary that the printing be carried out with extreme accuracy in order to meet stringent requirements. These requirements are necessary to ensure that when the data printed is read subsequently by mechanical readers, it is read properly. A poorly or inaccurately printed character will not be read accurately.

The E13B font, for example, is a style of printing which is used by the banking industry in the U.S.A. and other countries for printing on checks and other financial documents. This font is printed with a magnetic ink, and the data printed thereby is generally referred to as MICR (magnetic ink character recognition) data.

A convenient way of printing MICR data in an E13B font is to utilize mechanical impact printing. The mechanical printing generally produces accurate, correctly-readable data. One of the ways of printing mechanically is to utilize a hammer which impacts against a typeface which has the character to be printed formed thereon.

Such mechanical printing is utilized, for example, in an encoder which prints MICR data on financial documents such as checks or deposit slips. Generally, a document to be printed upon is moved along a document track in the encoder to a print station therein where a transport drive roller is used to move the document at a constant velocity in the track during printing. The driver roller is rotated by a motor whose speed is monitored, for example, by a shaft encoder using a timing disc and associated circuitry. By using the rotational speed of the motor as a measure of the document's velocity at the print station, a hammer at the print station can be energized in synchronization with the document's velocity so as to provide constant spacing between the characters printed. This is generally true for printing at low speeds.

When the printing technique described in the previous paragraph is attempted at high speeds, irregular spacings between characters tend to occur. Because the document velocity at the print station is high when high printing speeds are attempted compared to the low speeds mentioned, any variation in document velocity at the high printing speeds will cause noticeable spacing irregularities. This is true because the hammer flight time, from energization to impact, for a particular hammer is constant, and at high printing speeds, the variation in velocity of a document at the print station has a greater effect on the associated total print cycle than it does at the slow printing speeds.

SUMMARY OF THE INVENTION

This invention relates to a circuit for responding to varying timing periods having a start signal and a stop signal to provide a measure of the duration of a said timing period, comprising: means for providing a first time duration which corresponds to the shortest timing period expected by said circuit; means for measuring a second time duration extending beyond an associated said first time duration, said second time duration being terminated by said stop signal; and means for developing a third time duration having a predetermined relationship to an associated said second time duration, and for providing a control signal at the end of said third time duration.

In another aspect of the invention this invention comprises: a printer for printing characters; means for moving a document in printing relationship with said printer; said printer having an actuating member which when energized effects printing on said document; and a circuit for controlling the spacing between characters printed on said document, comprising: means for generating a start signal and a stop signal in association with said moving means so as to provide an evaluation time period during which the velocity of a said document at said printer is evaluated; means for providing a first time duration which represents the shortest said evaluation time period expected by said circuit and which evaluation time period starts with said start signal; means for measuring a second time duration extending beyond said first time duration so as to provide a measure of delay required for said evaluation time period to effect equal spacing of characters printed by said printer, said second time duration being terminated by said stop signal; and means for developing a third time duration starting with the termination of said second time duration and having a predetermined relationship to an associated said second time duration, and for providing a control signal at the end of said third time duration, which control signal energizes said actuating member.

This invention is especially adaptable for use in controlling the intercharacter spacing of characters printed on documents. It is especially suitable for maintaining constant intercharacter spacing when printing in the specialized fonts mentioned earlier herein.

Another feature is that when this invention is utilized in a printer environment having a hammer which is fired to impact against a typewheel, for example, the hammer firing is synchronized to the instantaneous speed of a moving document which is to be printed upon.

This invention is simple, inexpensive, and easy to incorporate in a business machine such as an encoder which prints upon financial documents such as checks and deposit slips in the special fonts mentioned earlier herein.

These advantages and others will be more readily understood in connection with the following specification, claims and drawing.

DETAILED DESCRIPTION OF THE INVENTION

Figure 1:
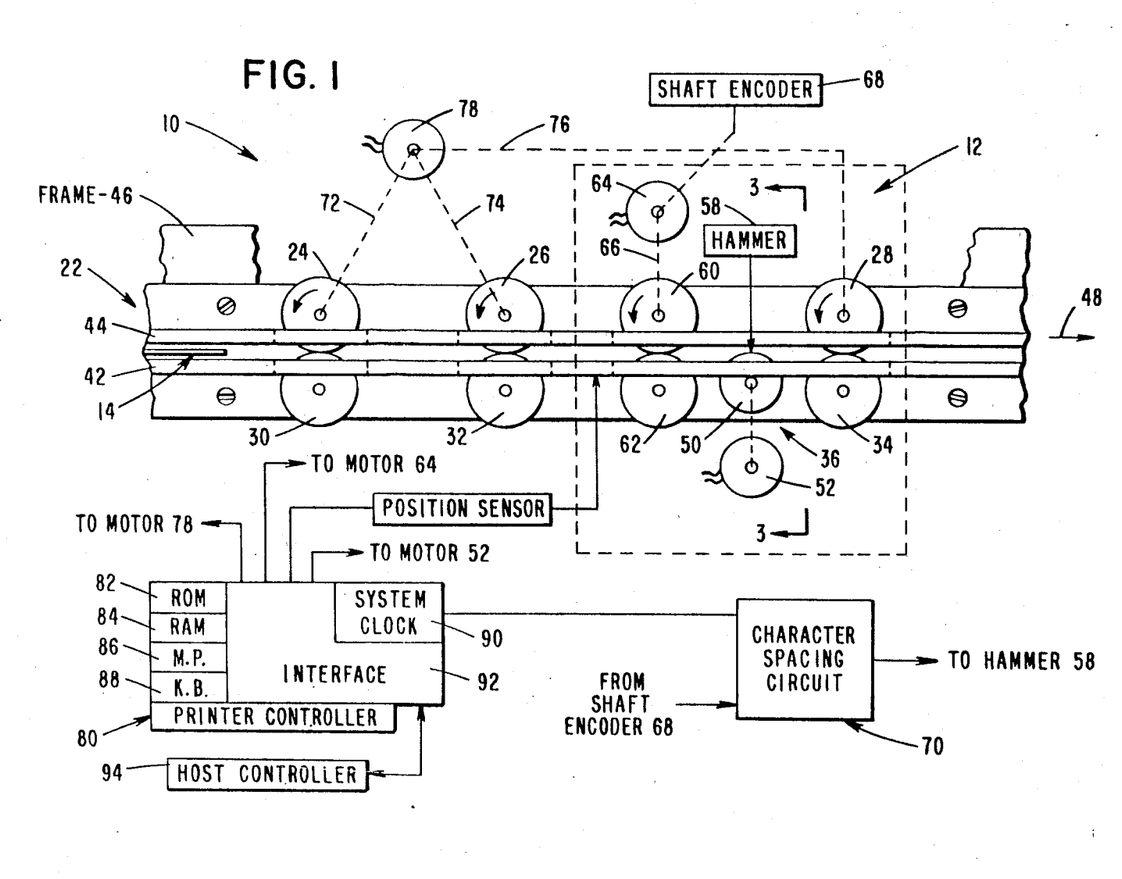
FIG. 1 is a plan view, in diagrammatic form, of an environment such as an encoder which includes a printer module in which the character spacing circuit of this invention may be used.

FIG. 1 is a plan view, in diagrammatic form, of an environment such as an encoder 10 which includes a printer module (shown in dashed rectangle 12) with which the character spacing circuit of this invention may be used.

Figure 2:
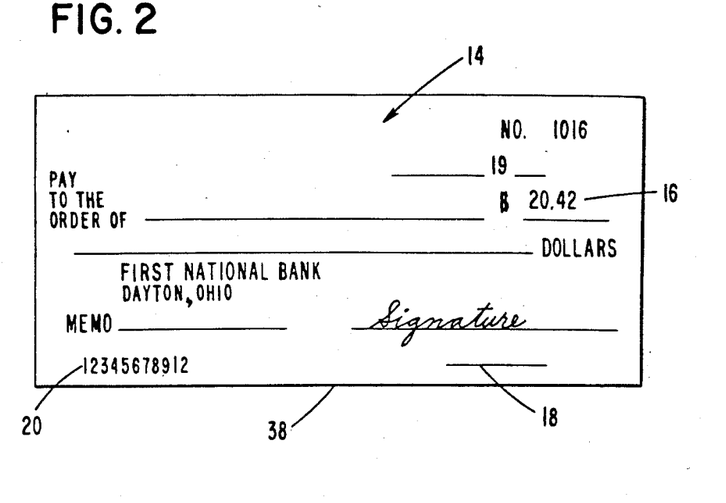
FIG. 2 is a plan view of a document, such as a check, which may be printed upon by the printer module shown in FIG. 1.

As general background information, the encoder 10 is a business machine which is used in the banking industry to process documents such as deposit slips and checks, for example, like check 14 shown in FIG. 2. During the processing of checks at a bank, for example, a point is reached at which the monetary or courtesy amount 16 of the check is printed on the check itself. Generally, the courtesy amount 16 is printed under the signature along line 18 thereon. In the U.S.A. and a number of other countries, the checks have magnetic ink character recognition (MICR) data printed thereon according to an E13B font, for example. This MICR data 20 (shown only in plain printing in FIG. 2) on the check 14 includes, for example, the account number, check number, and bank number. In the embodiment described, the printer module 12 is utilized to print the courtesy amount 16 along line 18 of documents like check 14 in MICR ink and in a stylized font like E13B, for example. On certain documents like blank deposit slips (not shown), the MICR data 20 may also be printed thereon by the printer module 12.

The printer module 12 is shown within a dashed rectangle in FIG. 1 so as to orient it in relation to the encoder 10. The encoder 10 includes a document track 22 and transport rollers such as 24, 26, and 28 which cooperate with associated pinch rollers 30, 32, and 34 respectively, to provide a means for moving a document like check 14 to a print station 36 in the encoder 10. The top edge of the check 14 is seen in FIG. 1, and it is fed on its lower edge 38 (FIG. 3), with the lower edge 38 gliding over the trough portion 40 of track 22 which also includes the vertical side walls 42 and 44. These side walls 42 and 44 are secured to the frame 46 (shown diagrammatically) and are spaced apart to receive the documents therebetween and to guide a document like check 14 to the print station 36 where the printing module 12 is located. The printing module 12 is then utilized to print the courtesy amount 16 on the associated check 14 as previously described. After printing, the document 14 is moved from the print station 36 by driver roller 28 and its associated pinch roller 34 and moved in the downstream direction shown by arrow 48 to other elements not important to an understanding of this invention.

Figure 3:
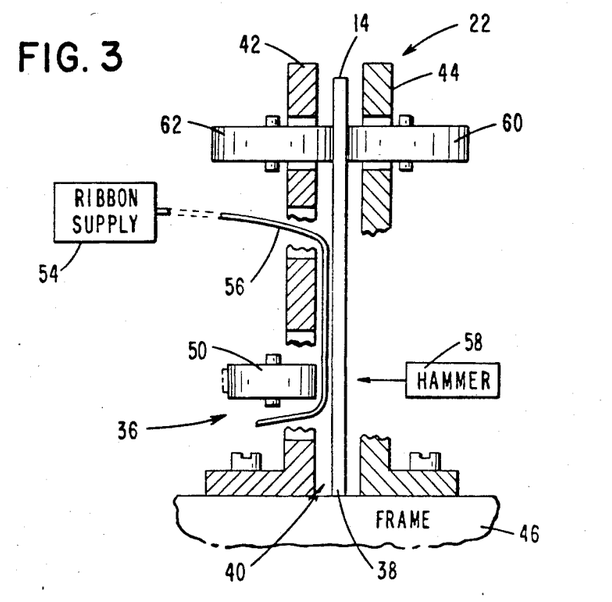
FIG. 3 is an elevational sectional view, taken along the line 3—3 of FIG. 1 to show, in diagrammatic form, additional details of the printer module.

The print module 12 (FIG. 1) is shown in more detail in FIG. 3, with a portion of the document track 22 being shown to orient the reader. The printer module 12 may be any of the conventional impact printers which employs at least one hammer or actuator to effect mechanical printing. For example, in the embodiment described, the printer module 12 includes a typewheel 50 having characters positioned around the periphery thereof, and the typewheel 50 is indexed or rotated by a drive motor 52 (FIG. 1) to present the necessary character for printing. A conventional means for supplying ribbon called ribbon supply 54 (shown only diagrammatically in FIG. 3) is used to present fresh ribbon 56 to the print station 36. When the desired character to be printed is positioned at the print station 36, the hammer 58 impacts against the check 14, ribbon 56, and typewheel 50 to form the selected character on the print line 18 of the check 14 in the example described. The check 14 is moved at a controlled rate of speed at the print station 36 by a drive roller 60 and its associated pinch roller 62. The drive roller 60 is rotated at a constant velocity by the motor 64 (FIG. 1) and is connected thereto by a conventional timing belt, for example, which is shown as dashed line 66. The transport rollers 24, 26, and 28 are considered "soft drive" rollers whereas the driver roller 60 is considered a "hard drive" roller; stated another way, the coefficient of friction of drive roller 60 is much greater than that of the transport rollers 24, 26, and 28 to enable the drive roller 60 to control the velocity of a document at the print station 36.

The velocity of a document at the print station 36 (FIG. 1) is determined by monitoring the rotational velocity of the motor 64. This monitoring is effected by a conventional shaft encoder 68 which is coupled to the output shaft of motor 64. The shaft encoder includes the usual slotted disc secured to the motor shaft, a light cell and photocell combination positioned in operative relationship with the slotted disc, and associated processing circuitry (not shown). The output of the shaft encoder 68 is a series of signals with one such signal being provided for each revolution of the motor 64. The output of the shaft encoder 68 is fed into the character spacing circuit designated generally as 70 which is the invention alluded to earlier herein, and which will be referred to hereinafter as CS circuit 70. However, before discussing the details of CS circuit 70, it appears appropriate to discuss some additional details about the encoder 10 and printer module 12.

The transport rollers 24, 26, and 28 (FIG. 1) of the encoder 10 are rotated at a constant velocity by suitable belt drives shown as dashed lines 72, 74, and 76, respectively, which belt drives are driven by the motor 78 to move the document 14 along the track 22 as previously explained.

The printer module 12 includes a conventional printer controller 80 which includes: a read only memory (ROM) 82 in which instructions may be stored, a random access memory (RAM) 84 in which instructions may be loaded daily from a supplemental storage (not shown), a processor (MP) 86 for executing the instructions, a keyboard (KB) 88 for entering data, a system clock 90, and interface circuitry 92 for interconnecting the various components mentioned. The printer controller 80 may also be coupled to a host controller 94 which, for example, may be part of the encoder 10.

Figure 4:
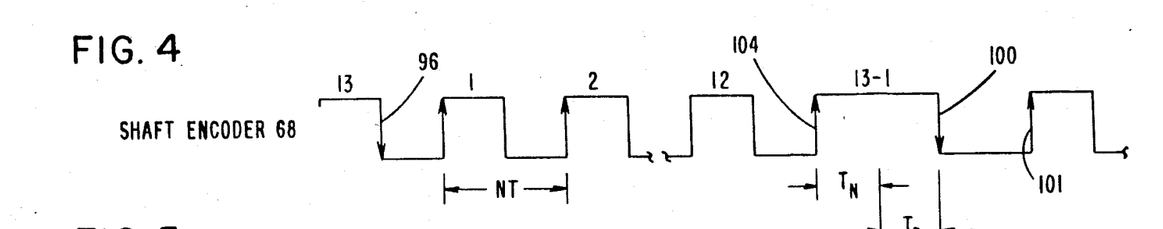
FIG. 4 shows the output of the shaft encoder shown in FIG. 1.
Figure 5:
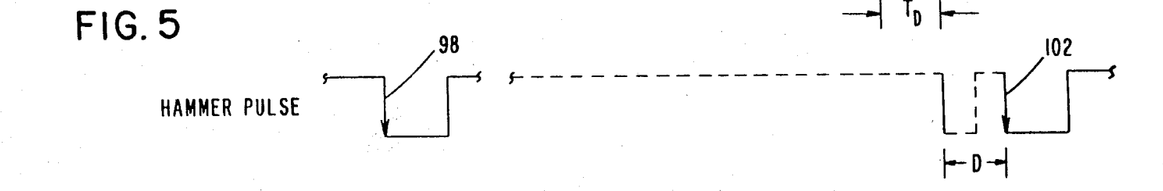
FIG. 5 shows the pulse to fire or actuate the hammer shown in FIG. 1.
Figure 6:
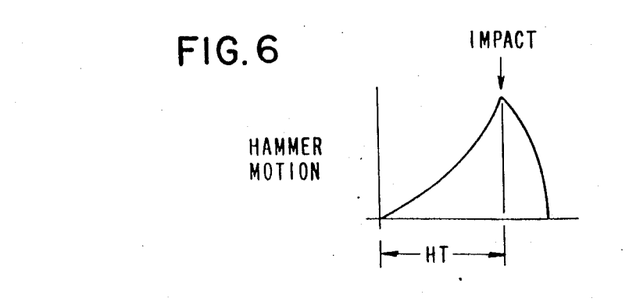
FIG. 6 is a schematic diagram showing the hammer motion from firing to impact.

The output of the shaft encoder 68 (FIG. 1) is shown in FIG. 4. In the embodiment described, the hammer 58 is fired to print a character in association with the typewheel 50 at every thirteen pulses from the shaft encoder 68, although naturally, this number could be changed for different applications. The nominal time (NT) between adjacent pulses such as 1 and 2 in FIG. 4 when the motor 64 is running at a nominal, constant velocity is one millisecond. At the fall of the thirteenth pulse, as shown by line 96 (FIG. 4), the hammer 58 is fired; in the embodiment described, the hammer firing pulse is negative-going, as shown by line 98 in FIG. 5. The hammer time, from the time the hammer 58 is actuated until it impacts against the typewheel 50, is constant for an individual hammer 58 and is shown as HT in FIG. 6. While the hammer time is constant for an individual hammer, the constants for a plurality of hammers may vary from about 2.6 to 3.0 milliseconds in the embodiment described. Note that in FIG. 1, only one hammer 58 is used in the printer module 12, and when selected, the hammer 58 has a constant HT. Assuming that the constant HT for a hammer 58 is three milliseconds, it means that three pulses from the shaft encoder 68 (FIG. 4) will occur between the time from line 98 of FIG. 5 (i.e. the hammer firing pulse) and the time of impact as shown in FIG. 6 which is not shown in the same time scale as FIG. 5.

The pulses marked 13, 1, 2, and 12 in FIG. 4 are pulses (from the shaft encoder 68) having nominal times (NT) when the motor 64 is running at its constant, nominal velocity. Under such circumstances even character spacing would result as earlier described herein. The width of pulse 13-1 is made about twice as long in time as the nominal time NT to represent a situation in which the motor 64 is running slower than nominal in which in turn would produce adjacent characters with closer than normal intercharacter spacing. In this regard, pulse 13-1 is made up of a nominal time ($T_N$) and a delay time ($T_D$), with $T_N$ being equal in time to the time expressed as the width of pulses 1 and 2 in FIG. 4, for example.

Note that without this invention, the fall of pulse 13-1, as shown by line 100 in FIG. 4, would be used to fire the hammer 58, and close inter-character spacing would result. However, with the CS circuit 70, a delay in firing hammer 58 is introduced, resulting in more even inter-character spacing. This delay marked D in FIG. 5 is substantially equal to the delay time ($T_D$) shown in FIG. 4 due to the motor 64 running slower than the nominal speed, and the hammer is fired at a time represented by line 102 instead of being fired at a time represented by line 100. This delay is introduced by the CS circuit 70 (FIG. 1) as will be described hereinafter.

It should be noted that the printer module 12 and its associated CS circuit 70 (FIG. 1) are designed so that any correction with regard to adjusting the firing of hammer 58 is done so as to introduce a delay D (FIG. 5) which is dependent upon the delay $T_D$ (FIG. 4). Another point is that the examination of the velocity of a document 14 being fed at the printer module 12 is performed "instantaneously" in the sense that the correction to firing the hammer 58 is ascertained by an evaluation of the thirteenth pulse from the shaft encoder 68; in the example described, this means the time represented by the width of pulse 13-1 shown in FIG. 4.

Some additional points need clarification prior to describing the CS circuit 70 (FIG. 1) in more detail. In the embodiment described, the transport rollers 24, 26, and 28 move the documents like check 14 along the track 22 at a velocity of 140 inches per second. When the check 14 reaches the printer module 12, the drive roller 60 therein controls the speed of the check 14 at a speed of ten inches per second during printing at the module 12. This printing speed of ten inches per second at print module 12 compares with general speeds of two and one-half inches per second in prior-art systems.

As far as prior-art systems are concerned, the inter-character spacing was determined generally by simply counting the revolutions of the motor which was moving the document in printing relationship with the associated printer. For example, the hammer associated with the printer might be "fired" or actuated every five revolutions of the motor moving the document in printing relationship with the printer. At nominal printing speeds of the two and one-half inches per second mentioned, there is generally no problem with inter-character spacing. However, at speeds of ten inches per second during printing, variations in the speed of the motor moving the document in printing relationship with the printer become a problem with regard to inter-character spacing for the reasons mentioned earlier herein. As an example, if the speed of the motor moving the document during printing is slower than nominal, the resulting printed characters may be crammed together with little or no inter-character spacing, causing a distortion or error in reading when the characters are read subsequently.

A feature of the present invention is that the hammer firing is adjusted at the moment that firing the hammer is scheduled. Applying this to the specific embodiment disclosed, it means that the hammer 58 is scheduled to be fired every 13 revolutions of motor 64 or every 13 pulses from the shaft encoder 68. At the 13th pulse, the velocity of motor 64 is "examined" to determine its velocity with regard to the anticipated speed, and if an adjustment in the time when the hammer 58 is to be fired is necessary, the adjustment is made by delaying or extending the point in time in which the hammer is fired from the start of the 13th pulse from the shaft encoder 38. In other words, the CS circuit 70 is designed for the fastest speed anticipated from the motor 64, and any corrections to firing the hammer 58 are such as to delay the firing from this fastest speed. Stated another way, the corrections or adjustments are unidirectional in that they always delay the firing of hammer 58 by varying amounts of time.

As previously stated, the evaluation of the speed of the document or check 14 at the printer module occurs at every 13th pulse from the shaft encoder 68. This evaluation is initiated on the rise of the 13th pulse as shown by line 104 (start signal) in FIG. 4. A conventional counter circuit 106 (FIG. 7) receives the pulses from the shaft encoder 68 and provides a positive-going output on line 108 on the rise of the 13th pulse (104). The output of the counter circuit 106 remains at a positive or high level until the rise of the next pulse from the shaft encoder 68 as shown by line 101 in FIG. 4. The counter circuit 106 does not have to be a part of the CS circuit 70, shown in more detail in FIG. 7, although the circuit 106 is shown here merely for convenience.

The CS circuit 70 (FIG. 7) includes an AND gate 110; an up/down counter 112, such as circuit #74191 which is available from Fairchild Corporation, for example; a series of AND gates 114, 116, 118, 120; a NOR gate 122; AND gates 124 and 126; a one-shot timer 128, such as circuit #9602 which is available from Fairchild Corporation, for example; an inverter 130; and various other resistors and capacitors (to be later defined herein) which are all interconnected as shown in FIG. 7.

Stated generally, one of the functions of the up/down counter 112 (FIG. 7) is to start upcounting clock pulses from the system clock 90 (FIG. 1) on the rise of a clock pulse and on the rise of the 13th pulse (start signal at line 104 in FIG. 4) from the shaft encoder 68. Another function of the up/down counter 112 is to start downcounting clock pulses on the fall (stop signal at line 100 in FIG. 4) of the 13th pulse from the shaft encoder 68. The counter 112 is set to a predetermined value so that it produces a counting output only when the count exceeds the predetermined value. The count by which the predetermined value is exceeded provides a measure of the delay to be introduced in the firing of hammer 58.

Figure 7:
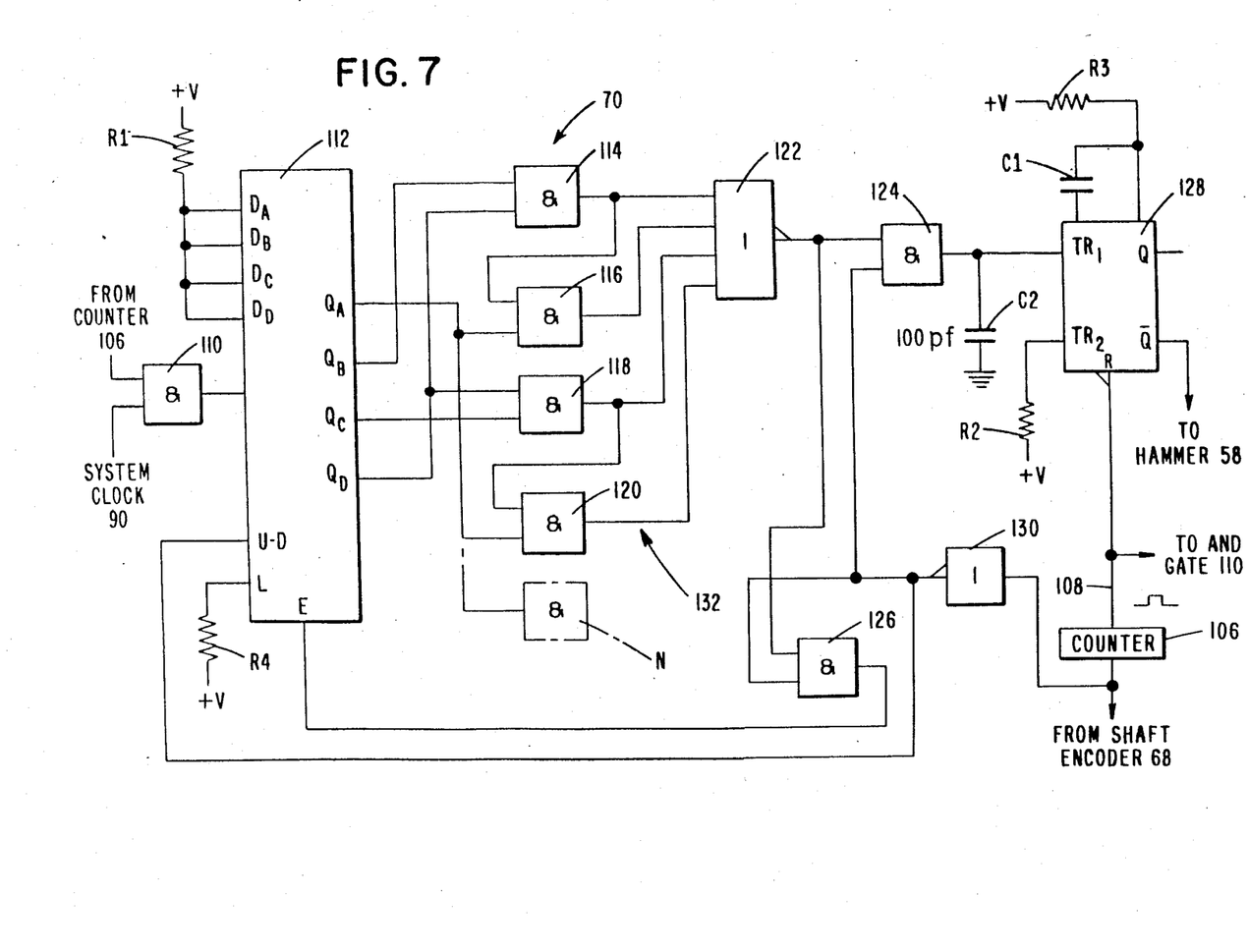
FIG. 7 is a schematic diagram showing more details of the character spacing circuit shown in FIG. 1.

The general explanation given in the preceding paragraph can be more readily understood in connection with a more detailed explanation of the CS circuit 70 (shown in FIG. 7). In the embodiment described, the preset value which is set upon the counter 112 is nine. In this regard, the appropriate terminals $D_A$, $D_B$, $D_C$ and $D_D$ can be connected through resistor R1 to a source of potential +V as is customarily done. With a preset value of nine on counter 112, its outputs $Q_A$, $Q_B$, $Q_C$ and $Q_D$ will be at a low level until the count registered on the counter 112 reaches ten (upcounting from zero), and with a count of ten thereon, the $Q_B$ and $Q_D$ outputs will rise to the high level. With respect to binary counts, the outputs $Q_A$, $Q_B$, $Q_C$ and $Q_D$ represent binary counts of 1, 2, 4, and 8, respectively. The pulses which are counted upon the counter 112, when it is conditioned to count, are pulses from the system clock 90. In the embodiment described, the frequency of the system clock 90 is 600 Hz., although the frequency of the clock 90 could be increased if finer resolution is necessary or required. The counter 112 is conditioned to count by placing a low level signal on its terminal E. This low level signal is maintained on terminal E by utilizing the output of AND gate 126. The positive pulses including the 13th pulse from the encoder 68 are inverted by the inverter 130 whose output is fed into AND gate 126 to keep its output low and thereby provide a low level signal to terminal E of counter 112 to condition it to count. The high level signal from counter circuit 106 (from the 13th pulse) is fed into the AND gate 110 to condition it so that counting of the pulses from the system clock 90 occurs on the positive-going side of the next such pulse. The pulses from the system clock 90 are then counted in an upcounting mode by the counter 112. The pulses from system clock 90 are also used in the downcounting mode mentioned.

As the upcounting on counter 112 progresses, the outputs therefrom remain at the low level through the predetermined count (nine in the embodiment described). When a count of ten is reached on counter 112, the $Q_B$ (a two) and $Q_D$ (an eight) outputs will rise to the high level. The QB and QD outputs from counter 112 are fed into AND gate 114 whose output switches to a high level when a count of ten is reached at counter 112. The high level from AND gate 114 causes the output of the control gate or NOR gate 122 to switch from a high level (when all inputs are at a low level) to a low level (when any one of its inputs is at a high level). The low-level output from NOR gate 122 is fed into AND gate 126 whose output remains at a low level to continue to condition the counter 112 to count.

The AND gates 114, 116, 118, and 120 (FIG. 7) are coupled conventionally in a matrix 132 which provides an output on one of these gates for a count of ten through thirteen, respectively. For example, the $Q_C$ (a four) and $Q_D$ (an eight) outputs of counter 112 are coupled to AND gate 118 to provide a high level output when the count on counter 112 reaches twelve. Additional AND gates like N (shown in dashed outline in FIG. 7) may be added and coupled conventionally to obtain counts above a count of thirteen which AND gate 120 provides. The outputs of the AND gates 114, 116, 118, 120, and N are fed into the NOR gate 122. A low level signal at the U-D terminal of the counter 112 places it in an upcounting mode, and correspondingly, a high level signal at the U-D terminal places the counter 112 in a downcounting mode.

Assume, in the example being described, that the count on counter 112 reaches twelve, and at this instant, the output of pulse 13-1 in FIG. 4 falls to a low level as at line 100. This falling level at line 100 from the shaft encoder 68 causes the output of the inverter 130 to rise to a high level, which, in turn, puts the counter 112 (via input U-D) in a downcounting mode. Once the counter 112 is triggered into the downcounting mode in the example described, the first count reached is eleven, and thereafter count ten is reached. It should be recalled that the output of the counter circuit 106 remains at a high level until the rise of the "14th" pulse as shown by line 101 in FIG. 4. This means that the AND gate 110 will be conditioned to pass the clock pulses 90 therethrough in both the upcounting and downcounting modes of counter 112. As soon as a downcount of nine is reached on counter 112, the outputs of AND gates 114-120 fall to the low level. With each of the inputs to NOR gate 122 being at a low level, the gate 122 produces an output control signal which rises to a high level. A high level output from NOR gate 122 and the present high level from inverter 130 cause the output from AND gate 124 to rise to a high level. The transition from low to high level from AND gate 124, fed into terminal $TR_1$ of one-shot timer 128, will trigger the timer 128. The timer 128 is one which responds only when the reset terminal R thereof is at a high level, and it is at this high level during the time that the output of counter circuit 106 is at a high level. The other trigger terminal $TR_2$ of timer 128 is not used; therefore, it is tied to a voltage +V via a resistor R2. Note that because it is desired to trigger the hammer 58 on the fall (line 100 in FIG. 4) of a pulse from the shaft encoder 68, the reset terminal R of the timer 128 is tied to the output of the counter circuit 106; this keeps the timer 128 inactive (avoids false triggering by noise, etc.) except during the 13th pulse which ends at line 101 in FIG. 4. The capacitor C-1 and resistor R3 are selected, conventionally, to provide the appropriate delay to fire the hammer 58. The $\overline{Q}$ output (a negative-going pulse) is used to fire the hammer 58 in the specific embodiment described; the negative-going pulse is shown on line 102 in FIG. 5.

The time delay associated with the timer 128 (FIG. 7) is two milliseconds in the embodiment described; the delay is provided just to provide the necessary operating time for the specific hammer 58 selected. Hammer 58, in the embodiment described, is one which is used in the NCR C775 Proof Encoder machine, for example, which encoder is manufactured by NCR Corporation. The 100 pf capacitor C2 is in the circuit 70 for the purpose of eliminating noise spikes. The L terminal of the counter 112 is tied to a voltage of +5 volts through a resistor R4 as is conventionally done to enable the counter 112 to upcount and downcount.

Notice that in the embodiment described, a delay (due to a change in the speed of motor 64) is introduced into the firing of the hammer 58 only when the count on counter 112 exceeds a predetermined amount which is nine. This predetermined amount of nine, for example, represents the fastest speed anticipated for a document (check 14) to travel at the print station 36. In the example described, the upcount on counter 112 (above nine) was 10, 11, 12, and 13 (for four clock pulses); this provides a measure of the delay required. After the fall of the 13th pulse (line 100 in FIG. 4), the output of the inverter 130 (FIG. 7) changes to a high level. The high level from inverter 130 is fed into the U-D terminal of the counter, and it puts the counter 112 into a downcounting mode (for four clock pulses) by downcounting 12, 11, 10, and 9; this downcounting for four clock pulses is the delay introduced to compensate for variations in the speed of motor 64 which drives or moves the check 14 at the print station 36.

As described, the control circuit 70 responds to varying time periods which represent changes in the spacing between characters to be printed in the embodiment described. The time periods start with the start signal 104 and end with the stop signal 100.

The control circuit 70 includes providing means for providing a first time duration which starts with the start signal 104 and which corresponds to the shortest timing period expected by the circuit 70; this providing means includes the shaft encoder 68, clock 90, counter circuit 106, the AND gate 126, and counter 112 as the principal elements.

The control circuit 70 also includes measuring means for measuring a second time duration which extends beyond an associated first time duration, with the second time duration being terminated by the stop signal 100; this measuring means includes the clock 90, counter 112, the matrix 132 of AND gates, and the control or NOR gate 122 as principal elements.

The control circuit 70 also includes developing means for developing a third time duration starting with the termination of the second time duration and having a predetermined time relationship to an associated second time duration (equal in the embodiment described), and also for providing a control signal at the end of the third time duration. This developing means includes the clock 90, counter 112, the matrix 132 of AND gates, the control or NOR gate 122 and the AND gate 124 as principal elements.

What is claimed is:

1. A circuit for responding to varying timing periods, having a start signal and a stop signal to provide a measure of the duration of a said timing period, comprising:
    means for providing a first time duration which starts with said start signal and which corresponds to the shortest timing period expected by said circuit;
    means for measuring a second time duration extending beyond an associated said first time duration, said second time duration being terminated by said stop signal; and
    means for developing a third time duration starting with the termination of said second time duration and having a predetermined time relationship to an associated said second time duration, and for providing a control signal at the end of said third time duration.

2. The circuit as claimed in claim 1 in which said third time duration is equal to said second time duration.

3. The circuit as claimed in claim 1 in which said measuring means includes an up/down counter which is conditioned to begin counting upon the occurrence of said start signal in an upcounting mode during said first time duration, said first time duration corresponding to a predetermined count on said up/down counter;
    said second time duration corresponding to an up-count on said up/down counter which upcount is greater than said predetermined count; and
    said third time duration being initiated by said stop signal which places said up/down counter in a downcounting mode to downcount from said upcount to said predetermined count;
    said developing means also including a control gate which responds to said up/down counter and which produces said control signal when said up/down counter reaches said predetermined count in said downcounting mode.

4. A circuit for responding to varying timing periods comprising:
    means for generating a start signal and a stop signal to provide a measure of the duration of a said timing period;
    an up/down counter which is conditioned in an upcounting mode to start upcounting upon the occurrence of said start signal and which is also conditioned to produce no output when upcounting to a predetermined number and thereafter to produce an output corresponding to a count greater than said predetermined number;
    a clock for incrementing said counter in said upcounting mode and a downcounting mode;
    a control gate to produce a first output while said up/down counter is upcounting to said predetermined number and to produce a second output while a count on said up/down counter is greater than said predetermined number,
    said stop signal being used to switch said up/down counter to said downcounting mode to downcount from said count towards said predetermined number; and
    the output of said up/down counter being effective to switch said control gate to said first output when said predetermined number is reached in said downcounting mode.

5. The circuit as claimed in claim 4 in which said means for generating a start signal and a stop signal includes a means for moving a document in printing relationship with a printer.

6. The combination comprising:
    a printer for printing characters;
    means for moving a document in printing relationship with said printer;
    said printer having an actuating member which when energized effects printing on said document; and
    a circuit for controlling the spacing between characters printed on said document, comprising:
    means for generating a start signal and a stop signal in association with said moving means so as to provide an evaluation time period during which the velocity of a said document at said printer is evaluated;
    means for providing a first time duration which represents the shortest said evaluation time period expected by said circuit and which evaluation time period starts with said start signal;
    means for measuring a second time duration extending beyond said first time duration so as to provide a measure of delay required for said evaluation time period to effect equal spacing of characters printed by said printer, said second time duration being terminated by said stop signal; and
    means for developing a third time duration starting with the termination of said second time duration and having a predetermined relationship to an associated said second time duration, and for providing a control signal at the end of said third time duration, which control signal is used to energize said actuating member.

7. The combination as claimed in claim 6 in which said measuring means includes an up/down counter which is conditioned to begin counting upon the occurrence of said start signal in an upcounting mode during said first time duration, said first time duration corresponding to a predetermined count on said up/down counter;

said second time duration corresponding to an upcount on said up/down counter which upcount is greater than said predetermined count; and said third time duration being initiated by said stop signal which places said up/down counter in a downcounting mode to downcount from said upcount to said predetermined count;

said developing means also including a control gate which responds to said up/down counter and which produces said control signal when said up/down counter reaches said predetermined count in said downcounting mode.

8. The combination as claimed in claim 6 in which said third time duration is equal to said second time duration.

* * * * *